Feb. 27, 1940.   L. G. SIMJIAN   2,192,159
POSE REFLECTING SYSTEM
Filed Oct. 31, 1936   2 Sheets-Sheet 1
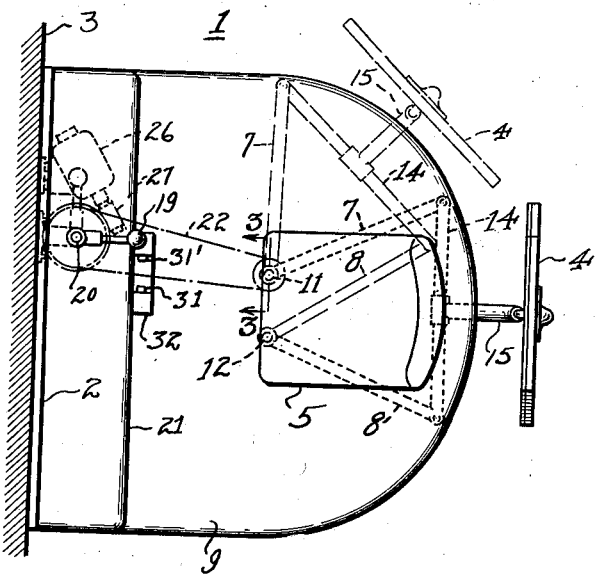
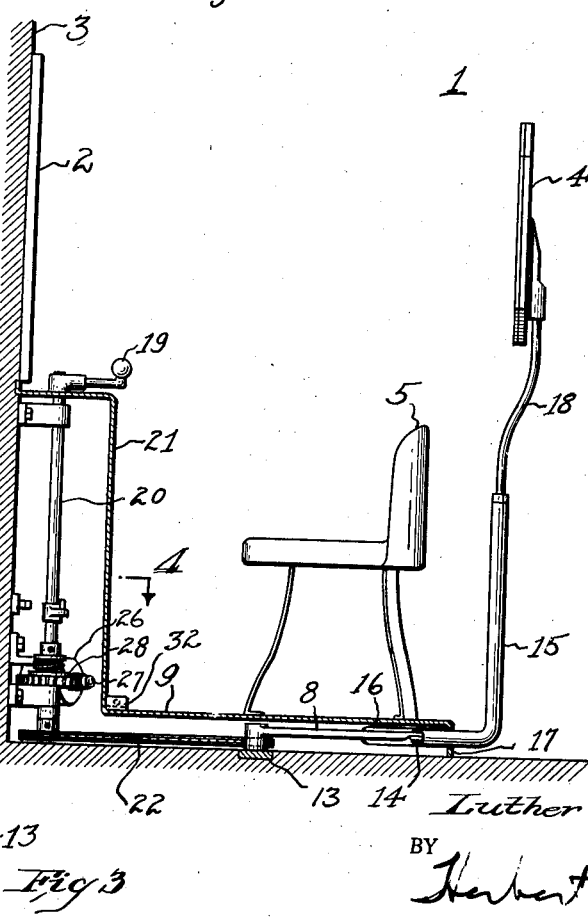
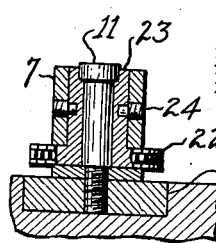
INVENTOR.
Luther G. Simjian,
BY
ATTORNEY.

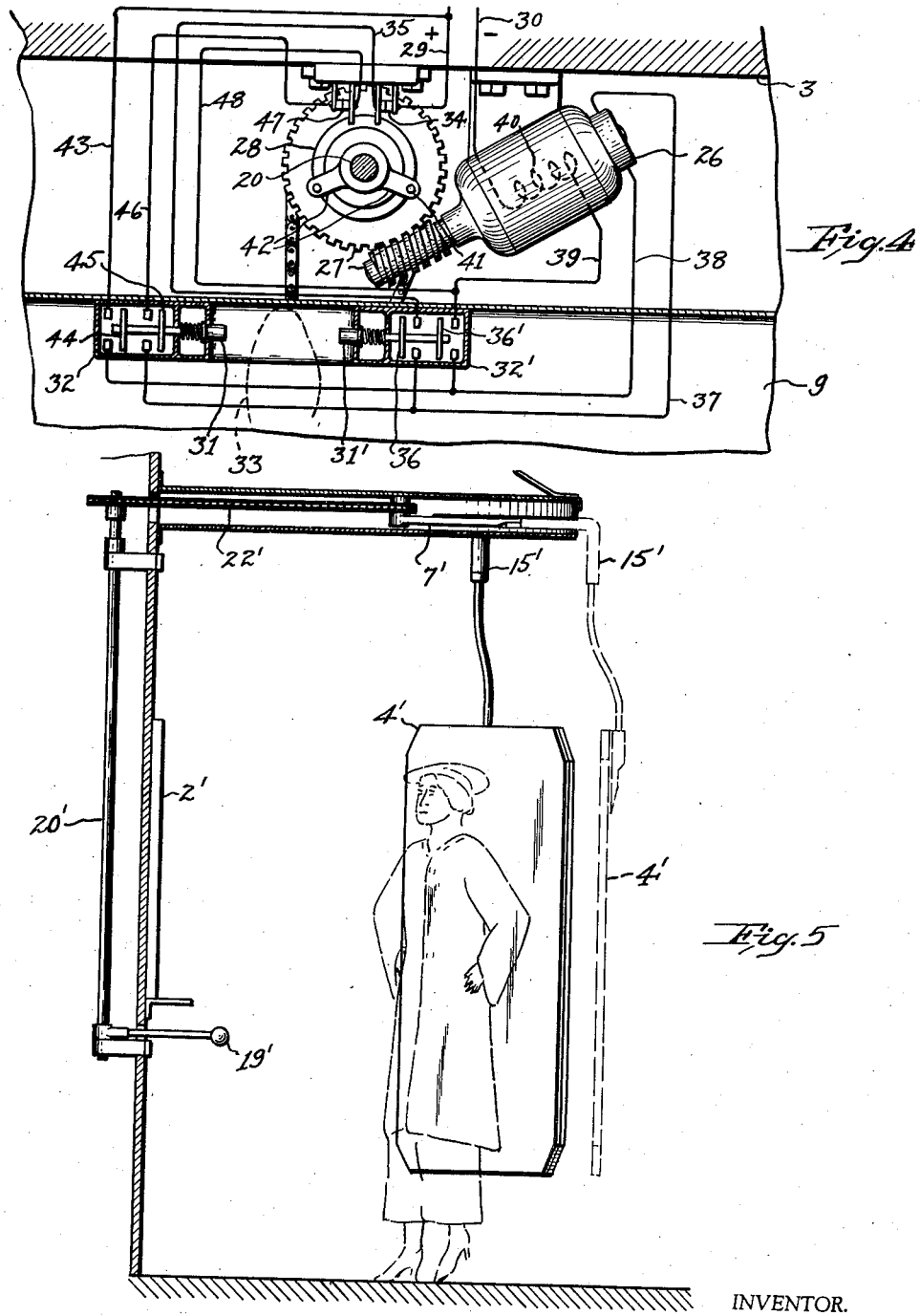

Patented Feb. 27, 1940

2,192,159

UNITED STATES PATENT OFFICE 2,192,159

POSE REFLECTING SYSTEM

Luther G. Simjian, New Haven, Conn., assignor to The Reflectone Corporation, Stamford, Conn., a corporation of Connecticut Application October 31, 1936, Serial No. 108,502

3 Claims. (Cl. 88—74)

This invention relates, generally, to mirror reflecting means, and the invention has reference, more particularly, to a novel pose reflecting system of such construction and arrangement that an observer may conveniently view images of his or her posture or figure from any angle desired, whereby the said system is especially suitable for use in beauty parlors, dress shops, barber shops, etc., and by haberdashers.

The ordinary fixed mirrors commonly used in business establishments of the above character merely enable the viewing of one's figure from a very limited number of angles unless one is willing to turn his head through various angles and hence assume all manner of postures necessitating undue physical exertion and resulting fatigue and annoyance.

The principal object of the present invention is to provide a novel pose reflecting system that is so constructed and arranged that the observer by merely looking substantially straight ahead is enabled to view his figure, or a portion thereof, from any angle desired.

Another object of the present invention lies in the provision of a novel pose reflecting system of the above character wherein a fixed mirror is provided in front of the observer, while a movable mirror operable through linkage is adapted to be moved to suitable positions to the rear or at the sides of the observer, whereby the latter is enabled, by looking ahead into the fixed mirror, to view his or her figure or desired portions thereof from any angle.

Still another object of the present invention is to provide a novel pose reflecting system of the above character wherein said movable mirror may be operated, either automatically through motor driven means or manually, the controlling linkage being so constructed and arranged as to position the movable mirror in any one of an unlimited number of positions such that the position of this mirror with respect to the observer is so coordinated with its angular position with respect to the fixed mirror that the observer will always see the image of his figure substantially in front of him, regardless of the angle of view.

A further object of the present invention lies in the provision of a novel pose reflecting system of the above character that is of simple, reliable and rugged construction as well as attractive in appearance.

Other objects and advantages will become apparent from the specification, taken in connection with the accompanying drawings wherein the invention is embodied in concrete form.

In the drawings:

Fig. 1 is a plan view of the novel pose reflecting system of this invention.

Fig. 2 is a vertical, part sectional view of the structure shown in Fig. 1.

Fig. 3 is an enlarged sectional view taken along line 3—3 of Fig. 1.

Fig. 4 is an enlarged fragmentary view taken along line 4—4 of Fig. 2, and

Fig. 5 is a part sectional view in elevation of a slightly modified arrangement.

Similar characters of reference are used in all of the above figures to indicate corresponding parts.

Referring now to Figs. 1 to 4, the reference numeral 1 designates the novel pose reflecting system as a whole, the same comprising a primary or fixed mirror 2 adapted to be mounted as on a wall 3, and a secondary or movable mirror 4 positioned some distance away and facing toward the mirror 2. Intermediate the mirrors 2 and 4 is positioned a chair 5 for receiving the poser or observer, which chair faces the fixed mirror so that the poser, in sitting in the chair, looks directly into mirror 2 and is enabled to view a virtual image of his or her head and upper body portion reflected from movable mirror 4.

The mirror 4 is adapted to be moved bodily around the back and sides of the chair 5 by use of a novel linkage arrangement that also serves to properly vary the angular position of the mirror 4 with respect to stationary mirror 2 during such movement, whereby light rays from the observer's body, doubly reflected from mirrors 4 and 2, will be directed to the eyes of the observer along lines that project substantially normally, i. e., at right angles to the plane of mirror 2, whereby the observer is not required to turn his or her head through more than a small angle in observing the head and upper body portion from any angle.

This novel linkage arrangement comprises a pair of diverging similar links 7 and 8 that are shown positioned below a platform 9 supporting the chair 5 and have their forward end portions pivotally mounted upon fixed studs 11 and 12 that extend upwardly from a suitable foundation or base plate 13. The studs 11 and 12 lie on opposite sides of that center line of chair 5 extending perpendicularly to mirror 2. Links 7 and 8 diverge rearwardly of studs 11 and 12 and the rear divergent end portions of these links are pivotally connected to the respective ends of an interconnecting link 14, the length of which is appreciably greater than the distance between studs 11 and 12.

Secured preferably to the center of link 14 is an L-shaped supporting post or member 15 that projects rearwardly through a slot 16 provided in the curved rear vertical wall or riser portion 17 of platform 9. Post 15 is provided with an extension 18 shown as of smaller diameter than the main portion of post 15, which extension has its upper portion deflected rearwardly somewhat and carries the movable mirror 4.

Suitable means is provided for actuating links 7 and 8 about their pivotal studs 11 and 12 to effect the desired movement of mirror 4. This means may be manually or power operated. For manual operation, a hand crank 19 is provided, which crank is fixed on the upper end of a rod 20 shown mounted for turning within suitable bearings and extending vertically within a dressing table or cabinet 21. The lower end of rod 20 has a sprocket fixed thereon for driving a sprocket chain 22 that extends to stud 11 and is connected for driving a sprocket provided on a sleeve member 23 that is interposed between the end of link 7 and stud 11.

Sleeve member 23 is turnably mounted on stud 11 and is fixed as by screws 24 to link 7, whereby any turning of this sleeve member, due to the turning of crank 19, also causes turning of link 7 about stud 11. Link 7 in turning, acts through interconnecting link 14 to also turn complementary link 8 and effect the desired movement of mirror 4. Thus, the turning of the hand crank 19 from its central full line position shown in Fig. 1 to the right hand dotted line position causes mirror 4 to move from the full line position directly behind the observer to the broken line position to the right side of the observer.

Owing to the peculiar linkage arrangement, the mirror 4 is not only moved around to the right of the observer, but it is simultaneously turned about a vertical axis an amount sufficient to retain the virtual image of the observer, reflected from mirror 4 into mirror 2, directly in front of the observer, whereby he need not appreciably turn his head in order to view his right profile, and this is true also of positions of mirror 4 intermediate those shown.

By turning crank handle 19 toward the left, the mirror 4 is also caused to move around toward the left while turning about a vertical axis through the proper angles to retain the virtual image in front of the observer, thereby enabling the observer to examine the left portion of his head from any desired angles. The mirror 4 is shown in its right hand limit of travel in broken lines in Fig. 1, in which position the lower portion of post 15 abuts the right end of slot 16, and similarly, when the mirror is at the left hand limit of its movement, it abuts the left end of slot 16.

For power operation of the mirror 4, an electric motor 26 is provided, which is shown connected through worm and wheel gearing 27 and friction clutch 28 to rod 20. Friction clutch 28 enables the manual turning of rod 20 through actuation of crank 19 without turning gearing 27 or motor 26, while at the same time providing a drive connection from motor 26 to rod 20. Motor 26 is shown as a D. C. motor supplied from leads 29 and 30 and controlled by oppositely disposed foot actuated push buttons 31 and 31' fixed to the stems of reversing switches 32 and 32'. The buttons 31 and 31' are arranged to be operated by side pressure of the user's or observer's foot 33.

Thus, when the observer turns his foot to the right so as to depress button 31', the switch 32' is closed, thereby energizing motor 26 to effect movement of mirror 4 to the right. This circuit for motor 26 may be traced as follows: from lead 29 through the contacts of limit switch 34, lead 35, through cooperating contacts and switch blade 36, lead 37, through the armature of motor 26, lead 38, cooperating contacts and switch blade 36', lead 39, and field winding 40 to lead 30. The user or observer may stop the movement of mirror 4 at any position of its travel by merely removing his foot from the button 31', thereby allowing switch 32' to open under the action of the opening spring and breaking the circuit for motor 26. The motion of the mirror 4 stops almost immediately owing to the presence of reduction gearing 27. If an exceedingly rapid or dead beat stoppage of motor 26 is desired, a dynamic braking circuit may be provided, as is well known to those skilled in the art.

When viewing one's profile, the user is apt to retain the button 31' depressed after mirror 4 has reached the right hand limit of its travel, which would result in wear of friction clutch 28, but for the action of limit switch 34 that serves to open the circuit of motor 26 just as the mirror reaches the limit of its travel determined by the end of slot 16. Thus, just as the mirror 4 reaches its limit of right hand travel, the pin 41 carried by bracket 42 fixed on rod 20 opens limit switch 34, thereby opening the circuit for motor 26 to stop the same.

The power operation of motor 26 to effect left hand movement of mirror 4 is similar to the above and is produced by depressing button 31, thereby completing a circuit for motor 26 to cause the same to operate in the reverse direction. This circuit is from lead 29 through lead 43, cooperating contacts and blade 44, lead 38 reversely through the armature of motor 26, lead 37, cooperating contacts and blade 45, lead 46, contacts of limit switch 47, lead 48, and lead 39 through field 40 to lead 30.

In the form of the invention shown in Fig. 5, the structure is similar to that of the previous figures except that the movable mirror 4' is shown as a full length mirror and is suspended from overhead, particularly adapting this form of the apparatus for use when examining garments, etc. In this figure, the poser stands in front of fixed mirror 2'. By moving the crank 19, the rod 20' is turned to drive chain 22', causing linkage 7', that is similar to linkage 7, 8, 14, to move depending post 15' and hence mirror 4' through positions similar to those taken by the mirror 4 of the previous figures, so that the observer may examine the garment, etc., from any angle desired while looking substantially directly into mirror 2'.

If desired, a chair may also be used with this form of the invention, in which case the mirror 4' would ordinarily be shortened. Also, a power drive controlled as disclosed in connection with the previous figures may be employed for operating mirror 4', thereby relieving the poser of this burden. When the power drive is employed, the manually operated crank 19 of Fig. 1 or 19' of Fig. 5 may be omitted.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pose-reflecting apparatus, including in combination: a seat; a cabinet adjacent the said seat; a first mirror extending above the said cabinet; a manually operable control-member; means for supporting the said control-member in position for manipulation by a poser seated upon the said seat; a movable second mirror movable around the opposite side of the said seat from the said first mirror and from the said cabinet in position to reflect various views of a poser to such poser in conjunction with the said first mirror; mirror-carrying means for carrying the said second mirror around the opposite side of the said seat from the said first mirror and from the said cabinet; connecting-means interconnecting the said manually operable control-member to the said second mirror for effecting the described movement thereof; tie-means interconnecting the said cabinet, the said seat, the said manually operable control-member and the said connecting-means into a unitary structure; the said connecting-means extending between the said manually operable control-member and the said second mirror and being constructed and arranged so that as the said second mirror is moved in either direction from its intermediate position by the said manually operable mirror-shifting means, the leading edge of the said second mirror will automatically move further away from the said cabinet, first mirror and the center of the said seat than the trailing edge thereof.

2. A pose-reflecting apparatus, including in combination: a seat; a cabinet adjacent the said seat; a first mirror extending above the said cabinet; a manually operable control-member; means for supporting the said control-member in position for manipulation by a poser seated upon the said seat a movable second mirror movable around the opposite side of the said seat from the said first mirror and the said cabinet in position to reflect various views of a poser to such poser in conjunction with the said first mirror; mirror-carrying means for carrying the said second mirror around the opposite side of the said seat from the said first mirror and the said cabinet; connecting-means interconnecting the said manually operable control-member to the said second mirror for effecting the described movement thereof; a platform interconnecting the said cabinet, the said seat, the said manually operable control-member and the said connecting-means into a unitary structure; the said connecting-means extending between the said manually operable control-member and the said second mirror and being constructed and arranged so that as the said second mirror is moved therearound in either direction from its intermediate position by the said manually operable mirror-shifting means, the leading edge of the said second mirror will automatically move further away from the said cabinet, first mirror and the center of the said seat than the trailing edge thereof; the said connecting-means also including portions which extend beneath the said platform and the said seat from the manually operable control-member to the said second mirror.

3. A pose-reflecting apparatus for use in conjunction with an observing mirror, including in combination: a seat; a movable mirror adapted to move around one side of the said seat to reflect various images of a poser upon the said seat to the said poser in conjunction with an observing mirror; control-means for controlling the shifting of the said movable mirror; and mirror-shifting means comprising a pair of complemental links, each pivotally connected at one end to the said movable mirror and each pivoted at its opposite end to a relatively fixed part of the structure, the adjacent ends of the said pair of links being pivoted more closely together than the opposite similar ends so as to produce an angular change in the disposition of the said movable mirror as the said links are swung about their pivots as an incident to the movement of the said movable mirror, the construction and arrangement being such that as the said movable mirror is moved in either direction from its intermediate position the leading edge of the said movable mirror will automatically move further away from the center of the said seat than the trailing edge of the said movable mirror.

LUTHER G. SIMJIAN.